Jan. 15, 1957  H. McK. STEELE  2,777,426
HYDRAULIC SPEED CONTROL VALVE
Filed Dec. 7, 1953
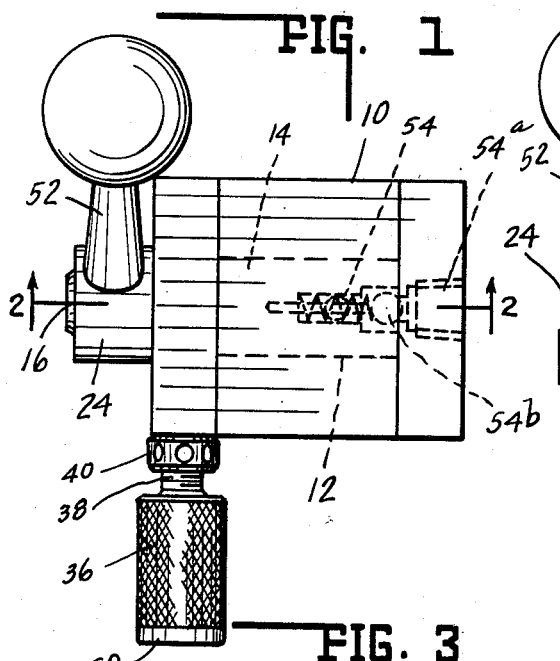
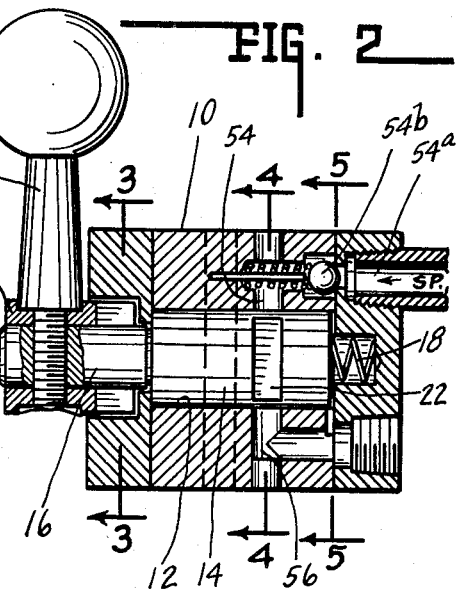
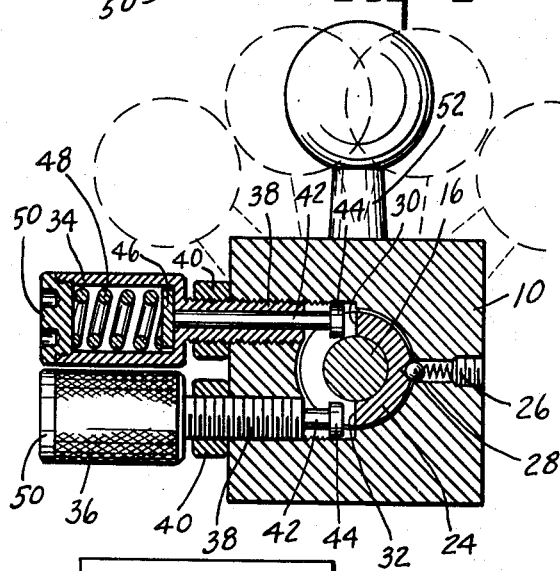
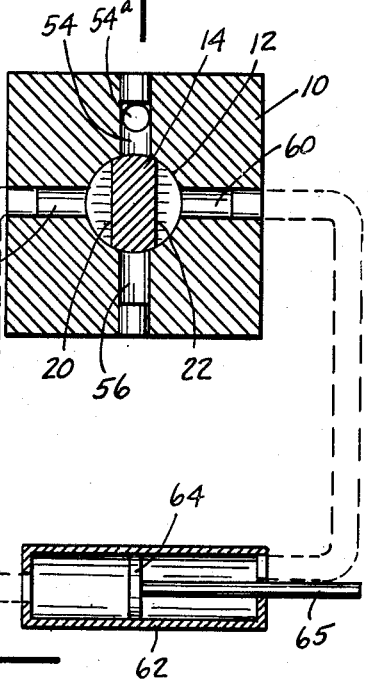
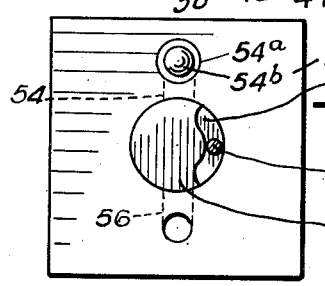
INVENTOR.
HORACE McKAY STEELE.
BY
Lockwood, Galt, Woodard & Smith
ATTORNEYS.

United States Patent Office 2,777,426
Patented Jan. 15, 1957

2,777,426

HYDRAULIC SPEED CONTROL VALVE

Horace McKay Steele, Huntington, Ind., assignor to Model Engineering & Manufacturing, Inc., Huntington, Ind., a corporation Application December 7, 1953, Serial No. 396,402

2 Claims. (Cl. 121—46.5)

The present invention relates to a hydraulic speed control valve and more particularly to a feed control valve for use in operating various types of mechanical equipment such as machine tools, lathes and the like, and any other type of mechanical equipment.

For example, in machine tool operation, economy in high speed production is materially improved by utilizing every feeding or traversing movement of the cutting tool to do useful work. The accomplishment of this is best demonstrated by considering the machine tool in which the tool has a cutting movement followed by a fast traversing movement to return the tool to starting position. The tool thus moves through a primary cutting cycle and then a secondary returning cycle, the latter cycle not producing any useful work. The present invention is characterized by the fact that the tool control is so arranged as to cause the cutting tool to produce useful work during this return cycle.

In particular, the present invention comprises a feed control valve which may be selectively operated in either one of two directions to cause useful and variable speed controlled work-movement of a lathe-cutting tool or other equipment.

One object of this invention is to provide a valve capable of developing an accurate rate of cutting feed and rapid traversing of the cutting tool, whichever operation is selected.

It is another object to provide a valve for regulating the flow of pressure fluid between two extreme flow conditions, viz., (a) controlled slow cutting feed condition, and (b) rapid traversing condition.

It is a further object of this invention to provide an accurately and reliably controllable valve which is capable of regulating the flow of pressure fluid between two predetermined flow rates and in opposite directions.

It is still another object to provide a valve of the double acting type which may be so controlled that predetermined rates of flow and flow reversal of pressure fluid may be obtained for reversing and controlling the speed of actuation of a double acting power cylinder or the like for mechanical operations.

To the accomplishment of the above and related objects, my invention may be embodied in the forms illustrated in the accompanying drawings, attention being called to the fact, however, that the drawings are illustrative only, and that modifications may be made in the specific constructions illustrated and described within the scope of the appended claims.

The full nature of the invention will be understood from the accompanying drawings and the following description and claims:

Fig. 1 is an elevational view of one embodiment of this invention.

Fig. 2 is a sectional view taken substantially along line 2—2 of Fig. 1, with a portion shown in elevation.

Fig. 3 is a sectional view taken substantially along line 3—3 of Fig. 2, with a portion shown in elevation.

Fig. 4 is a sectional view taken substantially along section line 4—4 of Fig. 2.

Fig. 5 is a sectional view taken on the line 5—5 of Fig. 2.

In the machine tool art, it is common practice to use a lathe for facing or finishing a work piece which is rotated at a predetermined velocity. In facing the work piece, the work tool is located both axially and radially to shave the end surface off the work piece. The movement of the tool is usually in two movements, the first movement being the one in which the tool rapidly approaches the work piece just prior to the cutting action and the other being the cutting action itself which ordinarily is maintained at a consistent relatively slow speed. Once the cutting action is completed, it is desirable that the next movement of the cutting tool be of a reverse nature; i. e., be in the reverse direction toward the work piece to perform a new cutting action on the back stroke.

A valve device for accomplishing such useful movements of a facing tool is illustrated in the drawings. This valve device is comprised of a body 10 suitably drilled and bored to provide the necessary fluid passages and bearing portions. The body 10 is centrally bored as at 12 to receive for rotation a valve stem 14 which is preferably solid and machined to provide a reduced diameter spindle 16. A compression spring 18 is housed in an end recess of the body for exerting an inward longitudinal pressure on the valve stem toward its spindle 16 for providing an effective seal against leakage between the shoulder adjacent the spindle and the abutting face of the body 10. The stem 14 is provided intermediate its ends with two oppositely disposed tangential valve slots 20 and 22, as best illustrated in Figs. 2 and 4.

On the reduced diameter spindle 16 is securely mounted a semi-annular block 24 (Fig. 3). A centering or neutral detent device generally indicated by the reference numeral 26, comprises essentially a spring-biased ball 28 which cooperatively engages an indentation in the outer periphery of the block 24. Said detent device serves to locate the stem 14 in its neutral position, but does not prevent such stem 14 from being suitably rotated to effect the necessary operation of the valve device.

Into the side of the valve body 10 and in registry with the end faces 30 and 32 of the block 24 are mounted two valve position-determining mechanisms 34 and 36, respectively. Each mechanism 34, 36 is comprised of a tubular casing having a reduced diameter sleeve 38 which is externally threaded to be received by a companion internally threaded opening in the body 10. Suitable lock nuts 40 serve to lock the respective sleeves 38 in the body 10 after their adjustment for a purpose which will become apparent from the following description.

A rod-like plunger 42 is slidably received by each of the reduced diameter sleeve portions of the casing 34, 36, and is provided with a head 44 for abutting engagement with the respective end faces 30, 32 of the block 24. The plunger 42 is of sufficient length to permit its extension into the interior of its respective casing 34, 36, and is there abutted by a suitable solid disc 46 which is engaged by a helical compression spring 48. The spring 48 is contained within its casing chamber by means of an end plug 50.

To manually rock the stem 14, and impart limited rotation thereto, a handle 52 is suitably secured to the outer extremity of the spindle 16. While the valve is shown herein as provided with a manually operated handle, it is obvious that the handle 52 may be in the form of a lever adapted to be suitably controlled by automatic mechanical or electrical means.

Considering for the moment only Figs. 2 and 3, slight movement of the handle 52 in, for example, a counter-clockwise direction, will serve to advance the block face 30 into engagement with the head 44 of the plunger 42 in the casing of mechanism 34. With a mere touching engagement between the block face 30 and the plunger 42, the valve stem 14 will be rotated correspondingly, but the spring 48 will not be compressed. However, if it is desired to obtain further rotary movement of the stem 14, the handle 52 is forced further counter-clockwise to compress the spring 48. It may be noted at this point that the spring 48 is of such strength that an operator of the handle 52 can readily sense the contact of the face 30 with the head 44. Conversely, rotation of the handle 52 in a clockwise direction will serve to bring the block face 32 into contact with the plunger 42 in the casing of the mechanism 36. Accurate sensing control is thus available in operating the handle 52 in determining the exact position of the valve stem 14.

With reference to Fig. 4, a pressure fluid inlet port 54 is formed in the body 10 to communicate with the control stem receiving opening 12. Similarly, an exhaust port 56 is provided in the opposite portion of the body 10 and communicates with the opposite side of the stem bore 12. The pressure inlet port 54 communicates with a hydraulic line connection fitting 54a through a spring biased ball check valve 54b. Said fitting 54a is adapted for connection with a suitable source of hydraulic pressure indicated at SP. Two other ports 58 and 60 communicate with the bore 12 to extend oppositely therefrom in orthogonal relation to the inlet and exhaust ports 54 and 56 for suitable connection to a double acting tool actuating power cylinder diagrammatically illustrated at 62. With the valve in its illustrated position (Fig. 4) the power cylinder 62 will be inactive or at neutral. By rotating the valve, for example, in a counter-clockwise direction until the port 54 is opened, pressure fluid communication will be established from the port 54 through valve slot 22 and to the port 60. Pressure fluid will thereupon enter the right-hand end of the power cylinder 62 and will act to drive the piston 64 toward the left. Exhaust fluid from the left side of the piston 64 will be forced out of the cylinder 62 and back into the port 58, and thence through the valve slot 20 and out of the exhaust port 56.

By rotating the valve handle 52 in the opposite direction, communication will be established from the pressure fluid inlet port 54 to the port 58 for driving the piston 64 toward the right, exhaust fluid being forced into the port 60 through valve slot 22 and out of the exhaust port 56.

The rate of flow of pressure fluid from the inlet port 54 to the power cylinder 62 may be adjusted by varying the degree at which the valve slots 20, 22 are opened to the port 54. For example, if the handle 52 is moved a distance to open the port 54 half-way, the power cylinder piston 64 will be operated at one speed, but if the valve slots 20, 22 are completely opened to the port 54 the power piston 64 will be operated at a more rapid rate.

In a machine tool such as a facing lathe, the power cylinder 62 may be operatively connected through the piston rod 65 to the cutting tools to feed the latter into cutting relation with the work piece. Since the mechanism for accomplishing traversing of the cutting tools is well known and can be readily adapted to this invention within the state of the art, it is not necessary to describe a suitable work table herein.

It may be observed that through adjustment of the lock nuts 40 the sleeves 38 may be adjusted through screwing the said mechanisms 34, 36 into and out of the body 10 to vary the relative spacing of the heads 44 and plungers 42 to the faces 30, 32. By such adjustment, the speed of the feeding movement of the tool may be controlled by varying the angular displacement of the valve stem to a predetermined extent.

To positively limit the rotary movement of the valve stem or its angular displacement after it reaches its full open position against the pressure of spring 48, the end or shoulder of said valve stem 14 adjacent its bearing boss 18 is formed with an arcuate slot 14a, leaving end shoulders for engagement with a pin 14b freely extending therein and fixedly secured to the adjacent end of the body 10, as illustrated in Fig. 5.

Considering the valve device in its entirety, the mechanisms 34 and 36 are so adjusted in the valve body 10 that the clearance between the block end faces 30 and 32 and the respective plunger heads 44 will provide a predetermined flow of fluid from the pressure inlet port 54 to the power cylinder 62 when the handle 52 is operated sufficiently to take up one of the clearances to bring the respective block end face 30, 32 into touching engagement with the respective head 44. With the handle 52 so positioned as to produce this touching engagement, the power cylinder piston 64 will be moved at a rate corresponding to the extent of the valve pressure inlet port 54 opening. Thus, if the handle 52 is held to maintain the end face 30 into contact with the plunger 44, the piston 64 will be moved at a constant speed corresponding to the degree of opening of said port 54. By forcing the handle 52 to compress the spring 48 of the mechanism 34, said port 54 will be opened further to increase the rate of movement of the piston 64.

In practice, the clearances between the respective block end faces 30 and 32 and the plunger heads 44 represent a slow movement of the piston 64, whereas compression of the respective springs on the mechanisms 34 and 36 serve to represent an increase in this rate. The slow piston 64 movement may be considered as the cutting feed of the machine tool, whereas the more rapid movement may be considered as the necessary rapid traversing of the tool to bring it into cutting position relative to the work piece.

Summarizing briefly, a complete cycle of facing a work piece in a lathe may conform to the following procedure. The handle 52 is operated to an extreme position such as to compress the spring 48 in mechanism 34. This operation opens valve port 54 fully such as to cause rapid movement of the piston 64. This rapid movement serves to bring the cutting tool quickly up to the face of the work piece. Next, the handle 52 is released just sufficiently to allow for mere touching engagement of the block end faces 30 or 32 with the respective plunger head 44 whereby the return of the piston movement 64, and hence the cutting tool, will be at a slower rate but yet will be constant and accurate. Once the cutting movement is finished, either a new work piece may be faced or another facing cut made on the same work piece by merely moving the handle 52 in the opposite direction so as to reverse the directional movement of the cutting tool. This invention may therefore be considered as providing the same accurate control in either of two opposite directions of tool movement.

Thus, the degree to which the valve stem is rotated to initial engagement with one of the heads 44 in either direction determines the slow cutting speed of the tool through controlled rate of flow of the hydraulic fluid under pressure to the cylinder 62, the spring providing for maximum rate of flow for high speed movement of the tool. Thus, the invention meets, in a most simple and economical form, the desire to have a partial feeding motion of the tool or equipment in predetermined or controlled slow feed and then to have a rapid traverse in the same direction and also in the opposite direction. To obtain this result, it has been necessary in the past to use a multiplicity of valves and feed adjusting orifices.

From the foregoing it will be observed that by the above described arrangement there is provided a very simple hydraulic feed valve easily installed on the equipment which it is to control with a minimum of time and expense, including a saving in cost of material for hydraulic tubing.

The invention claimed is:

1. A hydraulic speed control valve having a body with an internal bore for receiving a valve stem, an operating lever connected with said stem for rotating it in said bore, a pair of diametrically opposed stop faces on said stem, a corresponding pair of stop members adjustably mounted in said body for engagement by said stop faces upon predetermined angular displacement of said stem in either direction, said stop members, each comprising a plunger slidably mounted in a tubular sleeve threadedly adjustable in said body, a casing on said sleeve housing a compression spring biasing said stem and stop member toward said stop face to provide a spring biased adjustable stop unit, inlet and exhaust ports communicating with said bore positioned to be selectively controlled by the angular displacement of said stem, said ports being operatively connected with a source of hydraulic pressure and mechanism to be operated thereby, respectively, and a reduced diametrically disposed web-like portion on said stem extending in the plane of said bores for closing said bores when in one position, partially opening said bores to permit of limited passage of fluid therethrough upon said stem being rotated in either direction to stop member and stop face engagement, and fully open said bores to permit full and unobstructed flow of fluid therethrough upon the engaged stop member being displaced by further movement of said stem against the tension of its compression spring.

2. A hydraulic speed control valve comprising a valve body, a fluid passage in said body having its inlet connected with a source of hydraulic pressure, a valve member rotatable in opposite directions within said body to control the flow of fluid through said passage, said valve member having a pair of diametrically opposed stop faces thereon, a pair of externally threaded sleeves adjustably threaded into said valve body in parallel relation, each extending in alignment with one of said stop faces respectively, a spring casing rigidly mounted on the outer end of each said sleeve as an extension thereof terminating in spaced relation to said valve body, a compression spring housed in each said casing, a plunger slidably mounted in each said sleeve having a spring engaging disk movable in said casing against said spring, a stop head on each said plunger positioned to be engaged by one of said stop faces respectively for variably limiting the initial flow of fluid through said passage according to the threaded adjustment of said sleeves and permitting increased flow upon compression of its said spring, and a lock nut threadably carried on each of said sleeves for locking them in adjusted position.

References Cited in the file of this patent
UNITED STATES PATENTS

| | | |
|---|---|---|
| 1,588,659 | Christensen | June 15, 1926 |
| 2,388,369 | Shendrick | Nov. 6, 1945 |
| 2,485,094 | Gundersen | Oct. 18, 1949 |